INVENTOR.
ROBERT C. MC NABB
BY W. J. Shanley Jr.
HIS ATTORNEY

INVENTOR.
ROBERT C. MC NABB
BY
HIS ATTORNEY

United States Patent Office 3,260,956
Patented July 12, 1966

3,260,956
START-UP CIRCUIT FOR PROCESS CONTROL APPARATUS
Robert C. McNabb, Sunnyvale, Calif., assignor to General Electric Company, a corporation of New York
Filed Apr. 2, 1963, Ser. No. 269,992
9 Claims. (Cl. 330—75)

This invention relates to process control apparatus, and in particular, to improved two- and three-mode process controllers having start-up control circuitry which automatically brings the process to the set point during start-up with little or no overshoot attributable to "reset windup."

Two-mode process controllers, which generate proportional and reset functions, and three-mode controllers which generate both of these functions as well as a rate function, are subject to the long recognized problem of automatic start-up of a process when the controller is in saturation. Controller saturation may happen under normal conditions when large load changes occur. However, more commonly, this problem arises when the process has been shut down for an extended period with the controller left on "automatic control." The resulting large error signal will cause the controller output to saturate through the continued action of reset after the process has been shut down. This is known as "reset windup."

As is well known, analog techniques and an operational amplifier are used to obtain a wide range of response characteristics in controllers. Controller output current, which is normally proportional to the input error signal, is modified by function generation circuits such as reset and rate control circuits to provide an output current with the desired control characteristics.

Proportional control, i.e., the gain of the controller, is determined by the setting of the proportional band control which determines the amount of negative feedback coupled through a feedback capacitor from the output to the input of the amplifier. Where process load changes occur, a condition known as "offset" appears with proportional action alone. This "offset" is in the nature of a steady error between the controlled variable and the set point. Reset control action, which is obtained by introducing a resistance in parallel with the amplifier's input coupling capacitor, applies a corrective signal to the controller amplifier of the proper polarity to continuously reduce this offset. A continuous "offset" error will thus result in a steady corrective-current flowing through the reset resistance to change the controller output signal in a direction to tend to reduce this error. So long as there is an "offset" error signal, this corrective reset current will continue to flow through the reset resistance and, if the error signal becomes too large, the amplifier will saturate. This condition will exist, as was previously indicated, whenever the process has been shut down and the controller has been left on "automatic control."

Once the amplifier is saturated, the capacitance of the feedback network is effectively connected in shunt with the amplifier input and it will charge toward the error signal voltage due to the flow of reset current. This condition is known as "reset windup."

When the controller is in saturation the control valve, or whatever device is controlled by the output current, is controlled to apply maximum corrective action on start-up. When this occurs, an excessive overshoot will result, absent provisions for start-up control, since the relative sizes of the large error signal, when compared with the small signal potential at which the amplifier will saturate, will prevent the amplifier from coming out of saturation and resuming its control function until the controlled variable closely approaches the set point voltage. Excessive overshoot will thus result causing lost production as long as the controller is not at the set point.

It can be seen that in order to avoid the results of reset windup, it is necessary to bring the amplifier out of saturation a long enough time in advance of the time that controlled variable reaches the set point to permit the controller to resume its control function and prevent overshoot in the process. This means that the capacitance of the feedback network in shunt with the amplifier input must be rapidly discharged. It can be shown that if the maximum steady state amplifier input voltage appearing across the feedback capacitance during saturation can be made small with respect to the maximum error voltage and if it can be made to lead the error voltage by about one reset time constant, little or no overshoot will result. This "lead" of about one reset time constant is considered to be ample to bring the controller to set point with little or no overshoot since the reset time is normally chosen as a function of the process time constants.

One prior art technique for obtaining start-up control utilizes a lead network for coupling the error signal to the input of the amplifier so that the amplifier input signal will lead the error signal by a given amount when coming out of saturation. This network includes a resistive voltage divider for obtaining the desired minimization of the magnitude of the steady state amplifier input signal which will appear as a result of reset windup thus giving acceptable start-up characteristics. However, this prior art controller suffers the disadvantage that its design is the result of a compromise between desirable small signal control characteristics and desirable controller start-up characteristics. In order to obtain good start-up characteristics, the voltage divider should attenuate the error signal as much as possible. However, for normal controller operation, the loss of gain attributable to the attenuation introduced by the voltage divider should be made as small as possible since the loss must be compensated for by a corresponding increase in the gain of the amplifier. In addition, when solid state circuitry is utilized in the amplifier, the attenuation of the error signal makes it extremely difficult, if not impossible, to obtain desired steady state offsets of the order of .1% of the maximum set point voltage since this requires holding the amplifier input voltage at levels considerably below the normal D.-C. drift levels of good transistor amplifiers.

It is therefore an object of the invention to provide a start-up control circuit for a process controller which does not require a compromise between the controller's characteristics at normal signal levels and the start-up control characteristics of the controller.

It is a further object of the invention to provide a new and improved controller having improved start-up characteristics not heretofore obtainable.

It is still a further object of the invention to provide start-up control circuitry for a process controller which does not result in attenuating or dividing the error signal applied to the input of the controller amplifier during normal controller operation.

It is another object of the invention to provide a new and improved controller having excellent start-up characteristics by providing a voltage divider network in the input of the amplifier for attenuating the error signal applied to the amplifier input only during the time that the controller is in saturation.

In accordance with the invention, input error signals are applied across the RC reset network and controller amplifier input circuit, the latter having a pair of oppositely polarized diodes connected in shunt therewith. The diodes selectively cooperate with the reset network and the capacitance of the amplifier feedback circuit when the amplifier is in saturation to provide a lead network which will bring the amplifier out of saturation substantially one reset time before the controller reaches the set point. This will normally assure that the process reaches the set point without any overshoot.

The magnitude of the steady state error appearing on the amplifier input is limited to a value which is very small with respect to the maximum error signal. This is accomplished by the voltage divider network formed by the large reset resistance and the very low value of resistance of a conducting diode. This same ratio of resistances also controls the amount of lead introduced so that the amplifier input signal will lead the error signal by substantially one reset time.

It is an important feature of this invention that the diodes are effectively out of the circuit during normal controller operation, since the diodes are nonconducting during such operation, thus presenting a very high resistance with respect to the amplifier input resistance and the reset resistance. Thus, the signals applied to the amplifier input during normal operation are not attenuated by the dividing network thereby obviating the D.-C. drift problem and also making it possible to use lower gain amplifiers.

In accordance with another form of the invention, a voltage divider network, which is effective during both normal small signal conditions and saturation conditions, may be provided for stepping down the error signal applied across the series connected circuit in order to obtain reset times of desired magnitude with smaller physical components in the reset network.

In accordance with this form of the invention, it is necessary to introduce only that amount of signal attenuation necessary to obtain the desired size of physical components. Thus, a balance may be struck in selecting the amount of attenuation between the size of physical components and the foregoing amplifier design considerations. However, no compromise need be made between amplifier design considerations and start-up control characteristics since in accordance with the invention the start-up control characteristics are determined primarily by the diode divider network.

The subject matter of the invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

Figure 1:
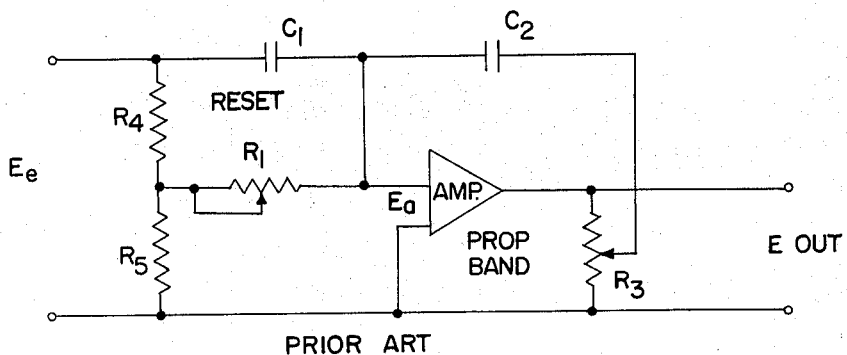
FIG. 1 is a schematic diagram of a prior art controller having provisions for start-up control.
Figure 2:
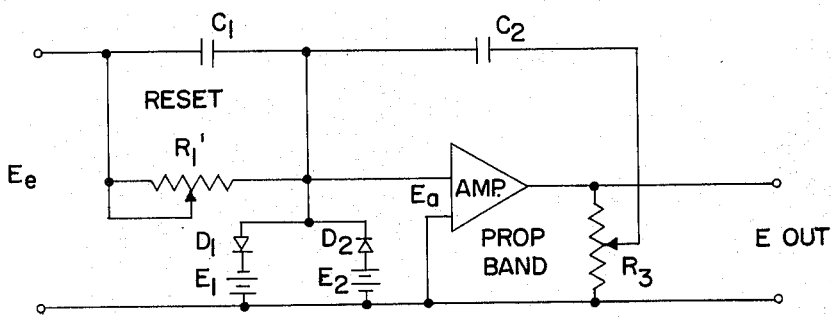
FIG. 2 is a schematic diagram of one form of the controller of applicant's invention having provisions for start-up control.
Figure 3:
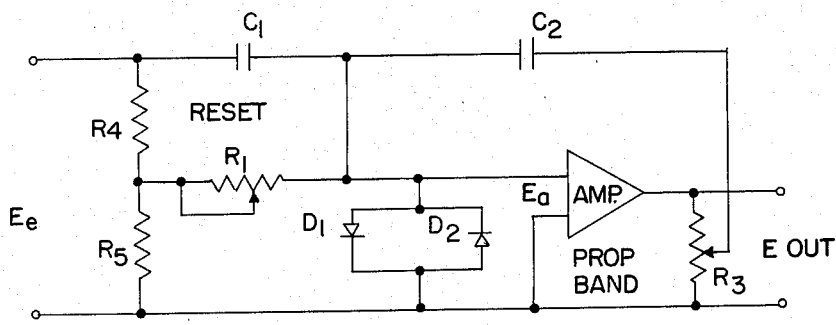
FIG. 3 is a schematic diagram of another form of the controller of applicant's invention having provisions for start-up control.
Figure 4:
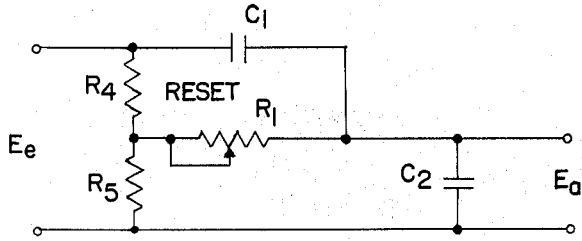
Figure 5:
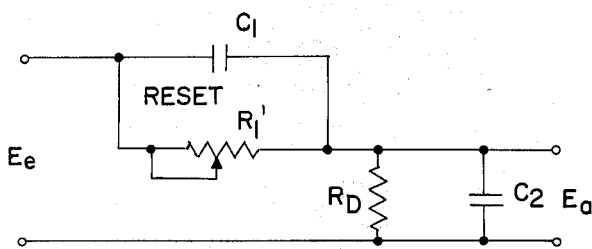
Figure 6:
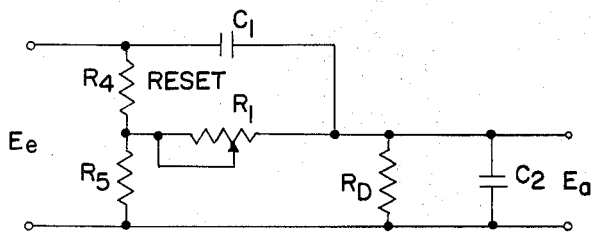
Figure 7:
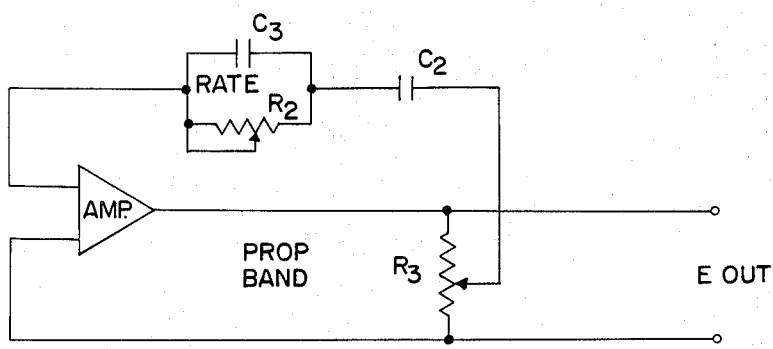

FIGS. 4, 5, and 6 are, respectively, schematic diagrams of the equivalent circuit for the controllers of FIGS. 1, 2 and 3 when these controllers are in saturation; and FIG. 7 is a schematic diagram of a portion of the controllers of FIG. 2 or 3 showing the manner in which a rate function may be introduced to convert the controllers to three-mode controllers.

The following discussion of the figures of the drawings will be primarily directed to an analysis of the operation of the controllers after they have been saturated due to the presence of a large error signal for a sufficient length of time for the signal upon the input of the controller amplifier to reach a steady state value.

It is not felt to be necessary for the purposes of this discussion to enter into a detailed description of the operation of the controllers during normal small signal disturbances except to the extent the small signal disturbance operation is affected by the start-up control circuitry.

Referring now to FIG. 1, the error signal $E_e$, which is equal to the difference between the control variable and the set point voltage, is applied to the voltage divider formed by resistors $R_4$ and $R_5$. This divider steps down the error signal applied to the amplifier input circuit both under normal small signal conditions and under conditions of amplifier saturation. If the signal appearing across $R_5$ exceeds the saturation potential of the amplifier, the amplifier will saturate. Once the amplifier is in saturation the equivalent circuit of the network which couples the input error signal $E_e$ to the input of the amplifier is as illustrated in FIG. 4.

It will be noted that capacitor $C_2$ of the feedback network is, in effect, connected in shunt with the input of the amplifier. Thus, it can be seen that capacitor $C_2$ will charge through reset resistor $R_1$ toward the steady state potential appearing across $R_5$. The magnitude of this potential will be determined by the magnitude of $E_e$ as well as the attenuation factor of dividers $R_4$ and $R_5$.

In order to bring the controller amplifier out of saturation, it will be necessary to discharge capacitor $C_2$ to the extent necessary for the potential across the input of the amplifier to drop below its saturation potential. Since the discharge path of $C_2$ is through resistors $R_1$ and $R_5$, its RC discharge time will be determined by the size of this capacitor as well as the values of resistors $R_1$ and $R_5$. Correspondingly, the discharge path of $C_1$ includes resistors $R_1$ and $R_4$ and, consequently, the RC discharge time of $C_1$ will be determined by its value of the values of resistors $R_1$ and $R_4$.

The phase angle of voltage $E_a$ with respect to voltage $E_e$ will thus be determined by the discharge time of capacitor $C_2$ with respect to the total discharge time of $C_1$ and $C_2$. To assure that $E_a$ leads $E_e$ by approximately one reset time constant, it can be shown that the discharge time of $C_2$ must be small with respect to the discharge time of $C_1$.

Referring now to FIG. 2, it will be noted that in this form of applicant's invention the error signal is applied across the network composed of $R_1'C_1$ in series with the amplifier input circuit. Thus, the entire error signal $E_e$ is applied without attenuation to the input of the amplifier during normal small signal operation. If, however, the error signal exceeds the diode conduction potential, one of the diodes will conduct connecting a low resistance $R_d$ across the amplifier input. This forms a voltage divider network which determines the extent to which the amplifier will go into saturation. The magnitude of the potential across the amplifier input will be determined by the magnitude of $E_e$ as well as the attenuation factor introduced by dividers $R_1'$ and $R_d$.

Referring now to FIG. 3, it can be seen that the magnitude of the steady state amplifier input signal during saturation is a function of the amount of attenuation introduced by the diode divider as well as the resistive divider and that the discharge time of $C_2$ is now determined by the value of $C_2$, $C_1$, the output impedance of the source of error signals and the tapped portion of $R_3$ in series.

The transfer functions of the embodiments of the invention will now be derived in order to establish the interrelationships between the components of each embodiment to facilitate a clear understanding of the invention.

In the following equations the first factor relates to the magnitude of voltage $E_a$ with respect to the magnitude of the error signal $E_e$. The second factor relates to the phase angle between $E_a$ and $E_e$.

Referring now to FIGS. 2 and 5, where elements will be identified by reference characters which are the same as correspondingly positioned elements of FIGS. 1 and 4, the transfer function of the embodiment of FIG. 2 when it is in saturation is as follows:

(1) $$\frac{E_a}{E_e} = \left[\frac{R_d}{R_1' + R_d}\right]\left[\frac{1+SR_1'C_1}{1+S\left(\frac{R_1'R_d}{R_1'+R_d}\right)(C_1+C_2)}\right]$$

where: S=Laplace operator

If we let:

(2) $$n = \frac{R_d}{R_1' + R_d}$$

We can rewrite Equation 1 as:

(3) $$\frac{E_a}{E_e} = [n]\left[\frac{1+SR_1'C_1}{1+SnR_1'(C_1+C_2)}\right]$$

If we let:

(4) $$C_2 = \beta C_1$$

(5) $$\frac{E_a}{E_e} = [n]\left[\frac{1+SR_1'C_1}{1+SR_1'C_1 n(1+\beta)}\right]$$

Since T is the controller reset time (in seconds):

(6) $$\frac{E_a}{E_e} = [n]\left[\frac{1+ST}{1+STn(1+\beta)}\right]$$

Note that the magnitude factor $[n]$ determines the maximum steady state value of $E_a$ during saturation. Thus, the voltage division introduced by divider found by $R_4$ and $R_5$ in FIG. 1 is now performed by $R_1'$ and $R_d$. It is also noted that the phase angle factor is controlled by $\beta$ and $n$ to determine the lead time. The significance of the transfer function of Equation 6 will be hereinafter analyzed for its effect upon the controller's start-up and normal signal characteristics.

Referring now to FIGS. 3 and 6, the transfer function of this embodiment may be derived as follows:

Let the attenuation introduced by divider $R_4R_5$ equal:

(7) $$\alpha = \frac{R_5}{R_4 + R_5}$$

Since $R_1$ is large compared to the total resistance $R_4$ and $R_5$, the presence of the divider in the circuit may be representated by its division ratio, and the values of $R_4$ and $R_5$ are not important to the derivation.

The transfer function for the embodiment of FIGS. 3 and 6 may be shown to be:

(8) $$\frac{E_a}{E_e} = [n\alpha]\left[\frac{1+ST}{1+ST(\alpha n)(1+\beta)}\right]$$

Comparing now Equations 6 and 8, it may be seen that if the reset times of the embodiments of FIGS. 2 and 3 are equal and coupling capacitors $C_1$ are equal, voltage divider $R_4R_5$ aids in reducing the magnitude of $E_a$ under steady state saturation conditions while it increases the time obtainable. The extent of the reduction in the magnitude factor and the increase in lead time will now be discussed by assigning representative values to the factors $n$, $\alpha$ and $\beta$.

The following values for the factors in Equation 6 are representative of the relationship of the component values which have been found to provide improved start-up characteristics in the controller of FIG. 2:

$\alpha = .33$
$\beta = 1$
$n = .01$ (9) $$\frac{E_a}{E_e} = [n]\left[\frac{1+ST}{1+S(.02)T}\right]$$

Thus, in the controller of FIG. 2 the steady state magnitude of $E_a$ will be equal to .01 times the set point voltage; i.e., $E_e$, and will lead $E_e$ by .98T when coming out of saturation.

Referring now to FIG. 3, and substituting the same representative values in Equation 8:

(10) $$\frac{E_a}{E_e} = [.0033]\left[\frac{1+ST}{1+S(.0066)T}\right]$$

Thus, in the controller of FIG. 3, the steady state magnitude of $E_a$ will be equal to .0033 times $E_e$ and will lead $E_e$ by .9934T when coming out of saturation.

It is recognized that the value for $n$ will, of course, vary with variations in the setting of the reset resistances. In assigning a value of .01 to $n$ for the purposes of the foregoing discussion it has been assumed that the reset resistances are set at their minimum adjustable values. It can therefore be seen that the maximum value for $n$ has been selected and that better start-up control characteristics would be obtained when $R_1$ and $R_1'$ are increased above their minimum values. If can be seen that the effect upon start-up characteristics of introducing voltage divider resistors $R_4$ and $R_5$, when compared with the operations of the controller of FIG. 2, is a second order effect which for all practical purposes results in the same start-up characteristics. Thus, the controller of FIG. 3 may be utilized in preference to the controller of FIG. 2 without adversely affecting start-up characteristics to any discernible extent when it is desirable to obtain a given reset time with reset network components having smaller physical size than those which would be needed to obtain the same reset time in the controller of FIG. 2. In addition, it is only necessary to make $\alpha$ small enough to obtain proper reset network component sizes thus minimizing the attenuation introduced during normal controller operation. This is to be contrasted to the controller of FIG. 1 which requires $\alpha$ to be as small as possible for start-up control characteristics thus resulting in very high signal attenuation during normal controller operation.

To summarize then, the value of $\alpha$ in the prior art controller has to be a compromise between good start-up characteristics and the amount of signal attenuation it represents during normal controller operations. In the controller of FIG. 2 no compromise is necessary between start-up characteristics and normal signal characteristics of the controller since the only divider present; i.e., $R_1'$ and $R_d$, is effective only after the amplifier is already in saturation. Therefore, the controller can be designed for optimum operation under each condition.

In the controller of FIG. 3, for all practical purposes, no compromise need be made between start-up characteristics and normal signal characteristics of the controller since the diode divider primarily determines start-up characteristics, divider $R_4R_5$ having been reduced to a second order effect. Thus, the value of $\alpha$ may be selected for component size reduction of $R_1'$ and/or $C_1$ without reference to start-up control characteristics.

This is possible in accordance with the invention since the diodes conduct only after the potential across the diodes exceeds the potential which causes the amplifier to saturate. These diodes, which represent a leakage resistance of approximately $10^9$ ohms across the input of the amplifier at normal error signal levels, consequently have no effect upon controller operation at small signal disturbances since the input impedance of the amplifier is of the order of 10 megohms. Therefore, in accordance with the invention a voltage divider is automatically enabled under conditons when it is advantageous for start-up purposes and it is automatically disenabled when its presence would be detrimental to normal controller operation.

Voltage sources $E_1$ and $E_2$ may be desirable, depending upon the diode and amplifier characteristics, in order to place a forward bias on the diodes so that they will limit $E_a$ to a desired potential above the saturation potential of the amplifier. For example, assuming that the knee of the curve of the diodes lies around 500 mv. and that the amplifier starts to go into saturation when 50 mv. is applied across its input, then $E_1$ and $E_2$ should be 300 mv. if you want the diodes to conduct when 200 mv. is applied across the amplifier's input. However, it has been found that sources $E_1$ and $E_2$ may normally be dispensed with for the sake of economy without any noticeable degradation in the operation of the controller of FIG. 2. For this reason, the controller of FIG. 3 does not include voltage sources for biasing diodes $D_1$ and $D_2$.

While the following component values are not to be considered as limiting the invention, these values have proved to be satisfactory for obtaining a controller in accordance with the invention when used with a D.-C. amplifier that will provide output currents of from 10–50 ma. when input signals of from 10–50 mv. are applied:

$R_{1(max)} = 10M$
$R_1'_{(max)} = 30M$
$R_3 = 20K$
$R_4 = 20K$
$R_5 = 10K$
$C_1 = 50\mu\text{fd}.$
$C_2 = 35\mu\text{fd}.$
$D_1$ and $D_2 = 1N458$
$E_a$ (saturation) = 50 mv.
$E_{e(max)} = +4$ volts (when set-point voltage = 4 volts)

It has been found that with the foregoing component values the steady state value of $E_a$ in the controller FIG. 3 equals approximately 200 mv.

Even though the invention has been described with reference to two-mode controllers, it is equally applicable to three-mode controllers as shown in FIG. 7. It has been found that a rate, or integrator, network may be inserted in series with $C_2$ in the feedback network of the controllers in FIGS. 2 and 3 without changes in component values theerof and will result in a three-mode controller having substantially identical start-up characteristics as the corresponding two-mode controller. The following rate, or integrator, network component values have proved satisfactory with the previously noted component values:

$R_2 = 40M$
$C_3 = 3\mu\text{fd}.$

While there have been described what are at present considered to be preferred embodiments of the invention, it will be apparent to those skilled in the art that various changes and modifications may be made therein without departing from the spirit or scope of the invention.

What I claim as new and desire to secure by Letters Patent of the United States is:

1. In a process controller, an amplifier having an input and an output, said amplifier being saturated at a first predetermined potential, means for capacitively feeding back to said input signals from said output, a source of error signals, phase lead network for coupling said source to said amplifier input, said network comprising first resistance means connected in series with said amplifier input and second resistance means connected in shunt with said amplifier input, said second resistance means assuming a first or second value of resistance at a second predetermined potential across the input, said first value of resistance being small with respect to the resistance of said first resistance means, and since second value of resistance being large with respct to the resistance of said first resistance means, said second resistance means assuming said first value only when the potential across said input exceeds said second predetermined potential, said second predetermined potential being in excess of said first predetermined potential of said amplifier.

2. In a process controller, a D.-C. amplifier having an input and an output, said amplifier being saturated at a first predetermined potential, means for capacitively feeding back to said input an adjustable portion of the signal appearing at said output for providing proportional band control, a source of error signals, coupling capacitor means to couple said error signals to said input, resistance means in parallel with said capacitor for providing reset action and first and second oppositely polarized diodes connected in shunt with the input of said amplifier, said diodes conducting when a second predetermined potential is applied to the input of said amplifier, said second predetermined potential being greater than said first predetermined potential.

3. In a process controller, an amplifier having an input and an output, said amplifier being saturated at a first predetermined potential, means for capacitively feeding back to said input a portion of the signal appearing at said output, a source of error signals, a network comprising resistance means and a capacitance connected in parallel, means for connecting said source and said network in series with said input, and first and second oppositely polarized diodes connected in shunt with said input for presenting very high values of resistance with respect to said resistance means when in their nonconducting condition and very low values of resistance with respect to said resistance means when in their conducting condition, each of said diodes remaining in their nonconducting condition until the potential applied across said input exceeds a second predetermined potential in its forward direction, said diodes presenting a low resistance discharge path for the capacitance of said feedback means whenever either of said diodes conduct, said second predetermined potential being greater than said first predetermined potential at which said amplifier goes into saturation.

4. In a process controller, an amplifier having an input and an output, said amplifier being saturated at a first predetermined potential, means for capacitively feeding back to said input a portion of the signal appearing at said output, a source of error signals, a network comprising first resistance means and a capacitance connected in parallel, means for connecting said source and said network in series with said input, and second resistance means connected in shunt with said input for presenting a first value of resistance when in a first condition and a second value of resistance when in a second condition, said second resistance means being in said first condition when the potential applied across said input is less than a second predetermined potential and in said second condition when the potential applied across said input is greater than said second predetermined potential, said first value of resistance being large with respect to the input impedance of said amplifier and the resistance of said first resistance means, said second predetermined potential being greater than said first predetermined potential at which said amplifier goes into saturation.

5. In a process controller, an amplifier having an input and an output, said amplifier being saturated at a first predetermined potential, means for capacitively feeding back to said input a portion of the signal appearing at said output, a source of error signals, a first capacitance, means for connecting said source and said first capacitance in series with said input, first and second resistances connected in series across said source of error signals, a third resistance connected between said amplifier input and the juncture of said first and second resistances, said first resistance being connected in series with said third resistance across said first capacitance, and fourth means capable of assuming first and second conditions connected in shunt with said input, said fourth means presenting a first value of resistance when in said first condition and a second value of resistance when in said second condition, said fourth means being in said first condition when the potential applied across said input is less than a second predetermined potential and in said second condition when the potential applied across said input is greater than said second predetermined potential, said first value of resistance being very large with respect to each of said first, second and third resistances, said second predetermined potential being greater than said first predetermined potential at which said amplifier goes into saturation.

6. In a process controller, an amplifier having an input and an output, said amplifier being saturated at a first predetermined potential, means for capacitively feeding back to said input a portion of the signal appearing at said output, a source of error signals, a first capacitance, means for connecting said source and said first capacitance in series with said input, first and second resistances connected in series across said source of error signals, a third resistance connected between said amplifier input and the juncture of said first and second resistances for providing a reset action, said first resistance being connected in series with said third resistance across said first capacitance, and fourth means connected in shunt with said input for presenting a first value of resistance when in a first condition and a second value of resistance when in a second condition, said fourth means being in said first condition when the potential applied across said input is less than a second predetermined potential, said fourth means being in said second condition when the potential applied across said input is greater than said second predetermined potential, said third resistance being adjustable between maximum and minimum values for adjusting reset time, said first value of resistance being at least an order of magnitude larger than either said minimum value of said third resistance or the resistance of said input, said second predetermined potential being greater than said first predetermined potential at which said amplifier goes into saturation.

7. The combination of claim 6 in which said capacitive feedback means comprises a feedback capacitor, an integrator network for providing rate action and means for connecting said capacitor and said integrator network in series between said output and said input of the amplifier.

8. The combination of claim 7 in which said capacitive feedback means further comprises a potentiometer connected across said output, the slider of said potentiometer being connected to said series circuit for controlling the proportional band of said controller.

9. In a process controller, an amplifier having an input and an output, said amplifier being saturated at a first predetermined potential, means for capacitively feeding back to said input a portion of the signal appearing at said output, a source of error signals, a first capacitance, means for connecting said source and said first capacitance in series with said input, first and second resistances connected in series across said source of error signals, a third resistance connected between said amplifier input and the juncture of said first and second resistances for providing a reset action, said first resistance being connected in series with said third resistance across said first capacitance, and fourth means connected in shunt with said input terminals for presenting a first value of resistance when in a first condition and a second value of resistance when in a second condition, said fourth means being in said first condition when the potential applied across said input is less than a second predetermined potential, said fourth means being in said second condition when the potential applied across said input is greater than said second predetermined potential, said third resistance being adjustable between maximum and minimum values for adjusting reset time, said first value of resistance being at least an order of magnitude larger than either said minimum value of said third resistance or the resistance of said input, said second predetermined potential being greater than said first predetermined potential at which said amplifier goes into saturation, the minimum adjustable value of said third resistance being of the order of 100 times greater than said second value of resistance, the capacitance of said first capacitance and said feedback means being of the same order of magnitude.

References Cited by the Examiner
UNITED STATES PATENTS

| | | | |
|---|---|---|---|
| 2,298,657 | 10/1942 | Smith et al. | 328—171 |
| 2,560,709 | 7/1951 | Woodward | 330—96 X |
| 2,572,900 | 10/1951 | Winkler | 332—18 X |
| 2,861,185 | 11/1958 | Hopper | 328—171 |
| 2,861,239 | 11/1958 | Gilbert | 330—24 X |
| 2,932,734 | 4/1960 | Rosencrans | 328—171 |
| 2,956,234 | 10/1960 | Olsen | 330—10 |
| 3,005,163 | 10/1961 | Dulberger et al. | 330—10 |
| 3,058,068 | 10/1962 | Hinrichs et al. | 330—145 X |
| 3,132,308 | 5/1964 | Munson et al. | 330—145 X |
| 3,197,711 | 7/1965 | Richardson | 330—103 |

OTHER REFERENCES

Article by Farrenkopf, Instrument Society of America Journal, vol. 7, No. 7, July 1960, pages 62–66.

ROY LAKE, *Primary Examiner.*

R. P. KANANEN, *Assistant Examiner.*